(12) United States Patent
Chen et al.

(10) Patent No.: US 6,445,663 B1
(45) Date of Patent: Sep. 3, 2002

(54) DRIVE CAGE ASSEMBLY

(75) Inventors: Yun-Long Chen, Chung-Ho; Yu-Tai Liu, Hsin-Chuang; Kuang-Yu Chen, Tu-Chen; Alvin Liu, Pa-Li, all of (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/546,995

(22) Filed: Apr. 11, 2000

(30) Foreign Application Priority Data

Dec. 30, 1999 (TW) ...................................... 88222450 U

(51) Int. Cl.$^7$ ............................. G11B 33/02; G06F 1/16
(52) U.S. Cl. ....................................... 369/75.1; 361/685
(58) Field of Search ................. 369/75.1; 361/724–728, 361/747, 807–812, 683, 685, 686

(56) References Cited

U.S. PATENT DOCUMENTS 5,680,293 A * 10/1997 McAnally et al. .......... 361/685
5,828,547 A * 10/1998 Francovich et al. ........ 361/685
6,297,952 B1 * 10/2001 Liu et al. .................... 361/685
6,297,954 B1 * 10/2001 Seo ............................. 361/686

* cited by examiner

Primary Examiner—David L. Ometz
(74) Attorney, Agent, or Firm—Wei Te Chung

(57) ABSTRACT

A drive cage assembly of a computer enclosure for receiving a data storage device therein includes a cage, a securing plate and a coupling piece. The cage has a base wall, an upper wall horizontally extending from an upper edge of the base wall and a lower wall horizontally extending from a lower edge of the base wall. The cage defines a side opening. The base wall forms at least one pair of posts projecting from the inner side thereof for inserting into corresponding holes defined in the data storage device. The securing plate is attached to the side opening of the cage and also forms at least one pair of posts in its inner side for inserting into holes defined in the data storage device. The coupling piece couples the securing plate to the cage thereby securely mounting the data storage device to the cage.

9 Claims, 4 Drawing Sheets

DRIVE CAGE ASSEMBLY

BACKGROUND OF THE INVENTION

1. Field of the invention

The present invention relates to a drive cage assembly of a computer enclosure for receiving a data storage device therein, and particularly to a drive cage assembly that conveniently mounts a data storage device thereto without screws.

2. The Related Art

Data storage devices normally used in a personal computer include a hard disk drive (HDD), a floppy disk drive (FDD) and a compact disc read only memory (CD-ROM) drive. The data storage device is often fixed to a receiving cage of a computer enclosure by bolts. When mounting the data storage device to the computer enclosure, an assembler must align the data storage device with the receiving cage with one hand and tighten the bolts with the other hand. This process is tedious and laborious. Therefore, rails are attached to both sides of the data storage device to simplify the installation process.

Taiwan Patent Application Nos. 78201813 and 79209891 and U.S. Pat. Nos. 5,332,306 and 5,262,923 all disclose a mounting device comprising rails attached to both sides of a data storage device to slidably mount the data storage device in a cage of a computer enclosure. However, the rails are attached to the data storage device by screws. The problem of the time-consuming and cumbersome task of tightening the screws is not resolved yet. U.S. Pat. No. 5,599,080 and its corresponding Taiwan Patent Application No. 85210034 disclose a mounting device comprising rails attached to a data storage device by pushing pins integral with the rails into side holes in the data storage device. However, the pins are thin and flexible, and are easily bent during removal of the data storage device from a computer. Once the pins become bent, subsequent alignment and reconnection of the data storage device to a cage of the computer will be difficult. Moreover, the data storage device can not be firmly secured due to tolerance between the pin and the hole, thus allowing the data storage device to vibrate.

Furthermore, the rails used in these devices of the above mentioned prior art are complicated and manufacturing the opposite side rails requires two sets of dies, which significantly increases the cost of these devices.

The present invention overcomes the above disadvantages by providing an improved drive cage assembly for directly mounting a data storage device thereto.

SUMMARY OF THE INVENTION

An object of the present invention is to provide a drive cage assembly for mounting a data storage device thereto without screws.

In order to achieve the object set forth, a drive cage assembly of a computer enclosure for receiving a data storage device therein in accordance with the present invention includes a cage, a securing plate and a coupling piece. The cage has a base wall, an upper wall horizontally extending from an upper edge of the base wall and a lower wall horizontally extending from a lower edge of the base wall. The cage defines a side opening. The base wall provides at least one pair of posts projecting from the inner side thereof for inserting into corresponding holes defined in the data storage device. The securing plate is mountable to the side opening of the cage and forms at least one pair of posts in its inner side for inserting into holes defined in the data storage device. The coupling piece further couples the securing plate to the cage thereby securely mounting the data storage device in the cage.

This and additional objects, features and advantages of the present invention will become apparent after reading the following detailed description of a preferred embodiment of the invention taken in conjunction with the appended drawings.

DETAILED DESCRIPTION OF THE PREFERRED EMBODIMENT

A drive cage assembly constructed in accordance with the present invention is to receive and mount a data storage device, such as a CD-ROM drive, an FDD or an HDD. To facilitate the description, a CD-ROM drive is taken as an example to illustrate the present invention.

Figure 1:
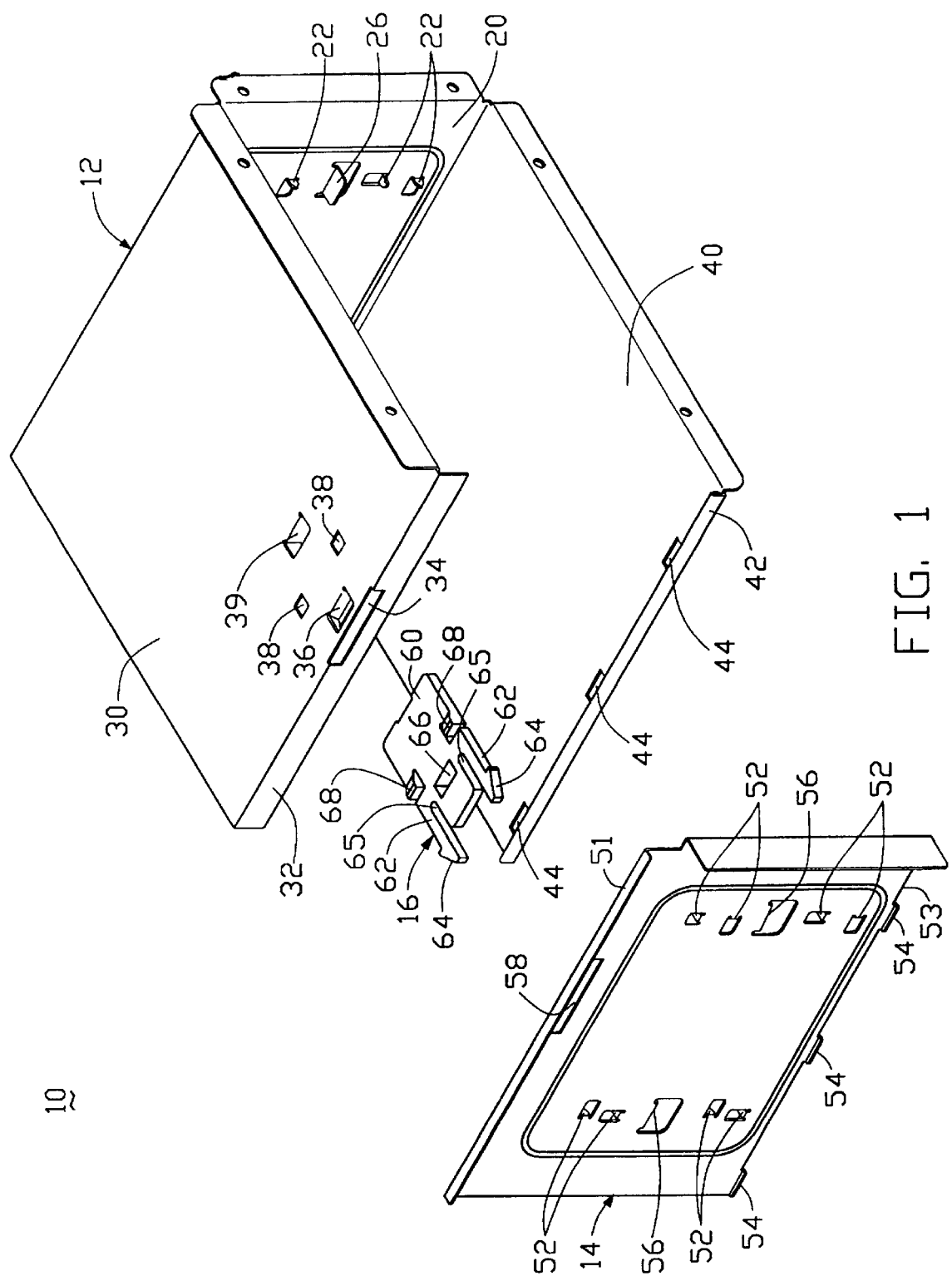
FIG. 1 is an exploded view of a drive cage assembly in accordance with the present invention.

Referring to FIG. 1, a drive cage assembly 10 in accordance with the present invention comprises a cage 12, a securing plate 14 and a coupling piece 16. The cage 12 has a base wall 20 and upper and lower walls 30, 40 horizontally extending from upper and lower edges of the base wall 20, leaving the back, the front and a side opposite to the base wall open. The base wall 20 forms pairs of first posts 22. Each pair of the first posts 22 extends perpendicularly for inserting into corresponding holes 96 defined in a CD-ROM drive 90 (See FIG. 2). The base wall 20 forms a plurality of level plate-like first tabs 26 projecting from an inner side thereof to support a bottom side (not shown) of the CD-ROM drive 90 (See FIG. 2). Free ends of the upper and the lower walls 30, 40 are respectively bent to form a first flange 32 and a second flange 42. A first slot 34 is defined in the first flange 32. A clip 36, a hook 39 and two locking holes 38 are formed on the upper wall 30. The clip 36 and the hook 39 are each stamped from the upper wall 30 to form an L-shape. The lower wall 40 defines a plurality of mounting holes 44 along the second flange 42.

The securing plate 14 forms pairs of second posts 52 and plate-like second tabs 56 corresponding to the first posts 22 and first tabs 26 of the base wall 20. The second posts 52, similar to the first posts 22, are inserted into corresponding holes 96 of the CD-ROM drive 90 (See FIG. 2). The second tabs 56, cooperating with the first tabs 26, support the bottom side (not shown) of the CD-ROM drive 90 (See FIG. 2). A lower edge 53 of the securing plate 14 forms latches 54 each being received in the corresponding mounting hole 44 to movably attach the securing plate 14 to the cage 12. An upper edge 51 of the securing plate 14 defines a second slot 58 aligned with the first slot 34.

The coupling piece 16 is received in the aligned first and second slots 34, 58 to couple the securing plate 14 to the cage 12. The coupling piece 16 comprises a base 60 and a pair of parallel, spaced latching arms 62 extending from the base 60. A barb 64 is formed on a free end of each arm 62. A space 65 is formed between each arm 62 and the base 60 for providing the arm 62 with resiliency during insertion into the second slot 58 of the securing plate 14. In the center of the base 60 a recess 66 is defined to receive the clip 36 of the cage 12 therein. The coupling piece 16 further forms a pair of projections 68 corresponding to and received in the locking holes 38 of the cage 12.

Figure 2:
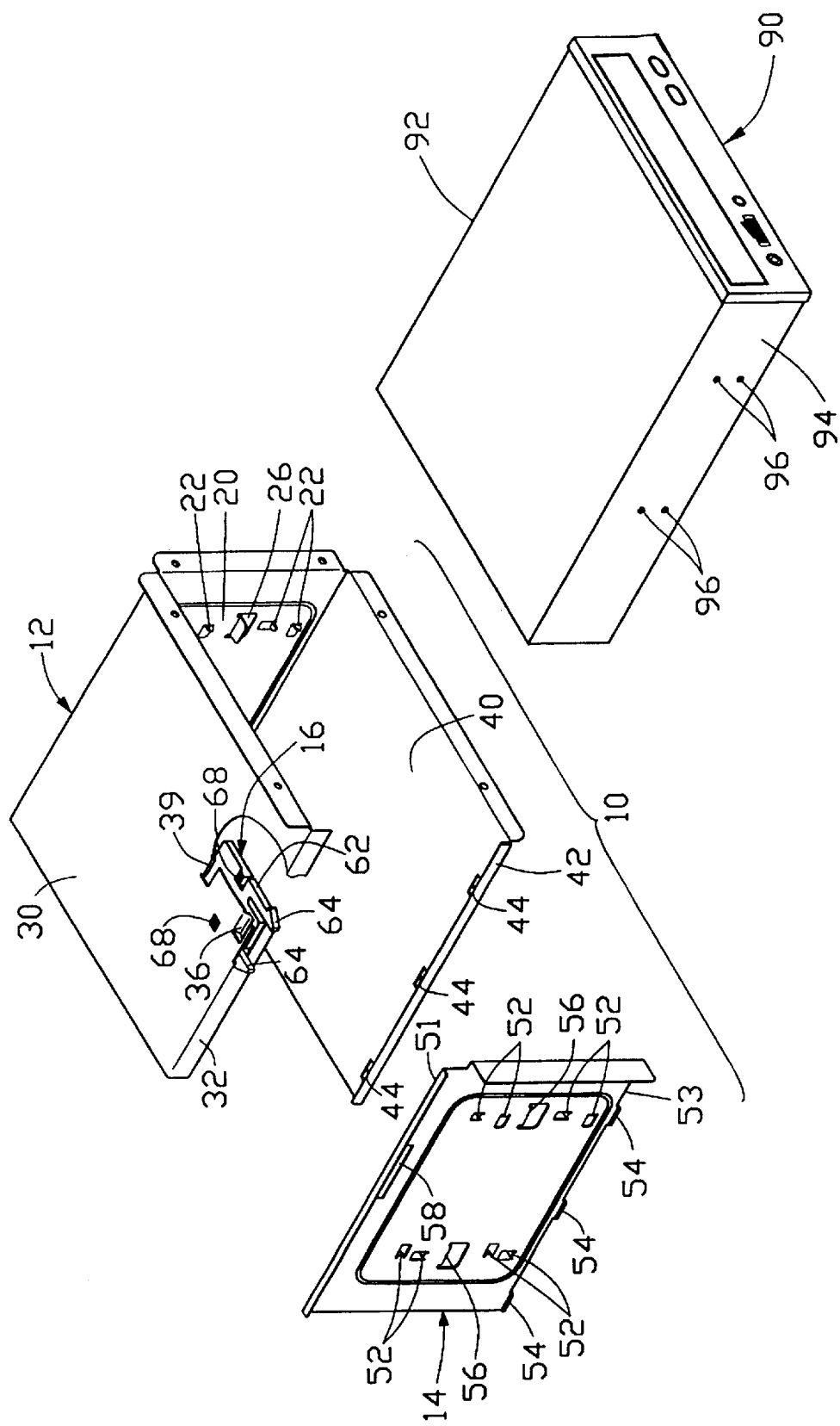
FIG. 2 is an exploded view showing a data storage device to be mounted to the drive cage assembly of FIG. 1.
Figure 3:
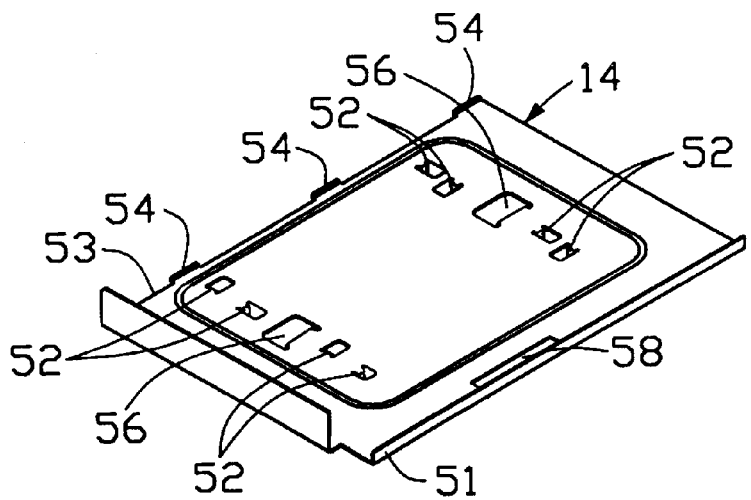
FIG. 3 is a partially assembled view of FIG. 2.
Figure 3:
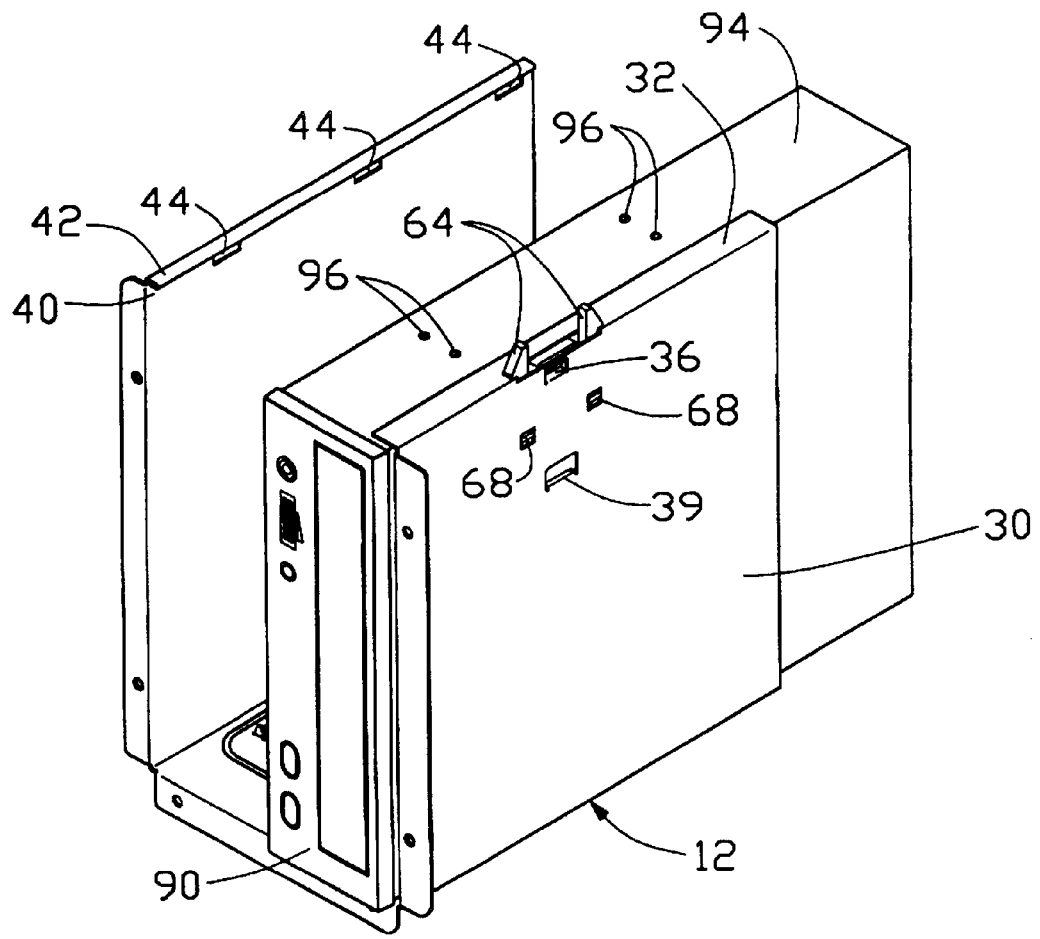
Figure 4:
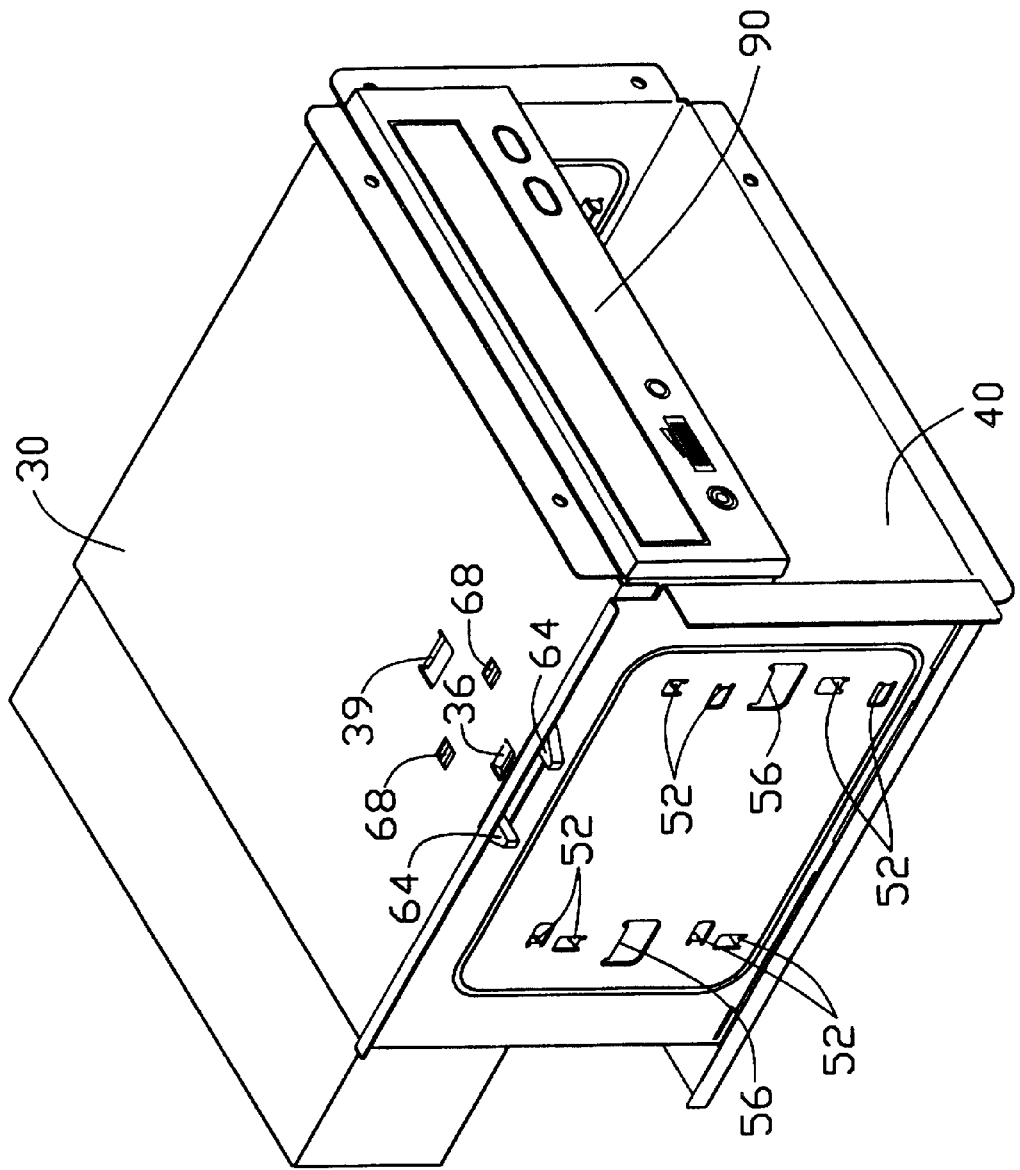
FIG. 4 is an assembled view of FIG. 3.

Referring to FIGS. 2–4, in assembly, the coupling piece 16 is firstly inserted into the first slot 34 of the upper wall 30 and is retained by the hook 39 supporting the free end of the coupling piece 16. The projections 68 are received in the locking holes 38 and the clip 36 of the upper wall 30 is received in the recess 66 thereby securely attaching the coupling piece 16 to the cage 12. Free ends of the arms 62 extend beyond the cage 12 with a gap left between the first flange 32 of the upper wall 30 and the barbs 64 of the arms 62 for receiving the securing plate 14 therein.

Then the cage 12 is positioned so that the side opening of the cage 12 faces upward as shown in FIG. 3. The CD-ROM drive 90 is then positioned in the cage 12 between the first tabs 26 and the upper wall 30 and the first posts 22 of the base wall 20 are inserted in the side holes 96 of the CD-ROM drive 90. Finally, the securing plate 14 is attached to the side opening of the cage 12. The latches 54 of the securing plate 14 are inserted in the mounting holes 44. The second posts 52 and the second slot 58 are aligned with the side holes 96 of the CD-ROM drive 90 and the first slot 34 of the upper wall 30, respectively. The barbs 64 extend through the second slot 58 and engage with an outer surface of the securing plate 14 and the second posts 52 are inserted into the side holes 96. Thus the securing plate 14 and the cage 12 are coupled together to surround the CD-ROM drive 90 therein. As shown in FIG. 4, the cage 12 together with the CD-ROM drive 90 is turned to its normally used position where the CD-ROM drive 90 is firmly retained by the first and the second posts 22, 52 and the first and the second tabs 26, 56.

While the present invention has been described in reference to a specific embodiment thereof, the description is illustrative and is not to be construed as limiting the invention. Various modifications to the present invention may be made to the preferred embodiment by those skilled in the art without departing from the true spirit and scope of the invention as defined by the appended claims.

We claim:

1. A drive cage assembly adapted to receive a data storage device therein, the data storage device defining holes in opposite sides thereof, the drive cage assembly comprising:
    a cage having a base wall, an upper wall horizontally extending from an upper edge of the base wall and a lower wall horizontally extending from a lower edge of the base wall, the cage defining a side opening, the base wall defining at least one pair of first posts adapted to be inserted into the holes of the data storage device;
    a securing plate mountable to the side opening of the cage and having at least one pair of second posts adapted to be inserted into the holes of the data storage device; and
    a coupling piece releasably coupling the securing plate to the cage thereby securely mounting the data storage device therein, wherein
        free ends of the upper and lower walls are respectively bent into a first flange and a second flange extending toward each other, the first flange defining a first slot aligned with a second slot defined in the securing plate to receive the coupling piece therein.

2. The drive cage assembly as claimed in claim 1, wherein the coupling piece comprises a base and a pair of spaced, resilient arms extending from the base.

3. The drive cage assembly as claimed in claim 2, wherein a barb extends from a free end of each arm to engage with an outer surface of the securing plate.

4. The drive cage assembly as claimed in claim 1, wherein an L-shaped clip, an L-shaped hook and a pair of locking holes are formed on the upper wall, the coupling piece defining a recess for receiving the clip and a pair of projections engaging the locking holes for attaching the coupling piece to the cage.

5. The drive cage assembly as claimed in claim 1, wherein a lower edge of the securing plate forms a plurality of latches for engaging with corresponding mounting holes defined in the lower wall.

6. The drive cage assembly as claimed in claim 1, wherein each pair of the posts inwardly and perpendicularly extends from inner sides of the base wall and the securing plate.

7. The drive cage assembly as claimed in claim 1, wherein the base wall and the securing plate further form a plurality of tabs for supporting the data storage device.

8. A combination comprising:
    a drive cage assembly and a data storage device therein;
    said drive cage assembly including a cage, a securing plate and a discrete coupling piece;
    said drive cage defining a base wall with upper and lower walls respectively extending horizontally from upper and lower edges thereof;
    a side opening formed in the cage opposite to said base;
    a plurality of posts formed on opposite surfaces of the base and the securing plate;
    the securing plate positioned around the side opening and engaged with the upper and lower walls;
    said discrete coupling piece releasably fixing the drive cage and the securing plate together; and
    the data storage device positioned between the base wall and the securing plate with thereof side holes respectively receiving the corresponding posts therein; wherein
        the discrete coupling piece includes means for preventing disengagement between the securing plate and the cage in a transverse direction parallel to an extending direction of said posts.

9. A method for assembling a data storage device into a cage, comprising the steps of:
    A. providing a cage including a base wall with upper and lower walls extending by two sides thereof and a side opening opposite to said base wall;
    B. providing a plurality of posts on an inner surface of the base wall;
    C. installing a coupling piece to the upper wall of the cage;
    D. inserting a data storage device into the cage between the upper and lower walls, in a transverse direction, with holes of the data storage device receiving the corresponding posts, respectively;
    E. attaching a securing plate to the cage around said side opening, along the same transverse direction, with thereof a plurality of posts received within the corresponding holes in the data storage device; and
    F. latching the securing plate to the cage by said coupling piece for preventing the securing plate from being detached from the cage in a direction opposite to said transverse direction, wherein the coupling piece extends across a slot of the upper wall of the cage and then engages with the securing plate.

* * * * *